US007200754B2

(12) United States Patent
Walters

(10) Patent No.: US 7,200,754 B2
(45) Date of Patent: Apr. 3, 2007

(54) VARIABLE EXPIRATION OF PASSWORDS

(75) Inventor: Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 10/378,317

(22) Filed: Mar. 3, 2003

(65) Prior Publication Data

US 2004/0177272 A1 Sep. 9, 2004

(51) Int. Cl.
*H04L 9/32* (2006.01)
(52) U.S. Cl. .................. 713/182; 713/183; 713/184; 726/2
(58) Field of Classification Search ................ 713/182, 713/183, 184; 726/2
See application file for complete search history.

(56) References Cited

U.S. PATENT DOCUMENTS

| | | | |
|---|---|---|---|
| 5,204,966 A | | 4/1993 | Wittenberg et al. |
| 5,530,230 A | * | 6/1996 | Smith et al. .................. 217/723 |
| 5,606,663 A | * | 2/1997 | Kadooka ...................... 726/18 |
| 5,682,475 A | * | 10/1997 | Johnson et al. ............... 726/18 |
| 5,734,718 A | * | 3/1998 | Prafullchandra ............ 713/183 |
| 5,812,764 A | | 9/1998 | Heinz, Sr. |
| 5,838,903 A | | 11/1998 | Blakely, III et al. |
| 5,862,323 A | | 1/1999 | Blakely, III et al. |
| 6,202,157 B1 | | 3/2001 | Brownlie et al. |
| 6,775,782 B1 | * | 8/2004 | Buros et al. .................... 726/2 |
| 6,970,562 B2 | * | 11/2005 | Sandhu et al. ................ 380/30 |
| 2002/0049916 A1 | * | 4/2002 | Nozaki et al. .............. 713/202 |
| 2002/0147930 A1 | * | 10/2002 | Pritchard et al. ........... 713/202 |
| 2003/0018919 A1 | * | 1/2003 | Arbab et al. ................ 713/202 |
| 2003/0123433 A1 | * | 7/2003 | Stafne ........................ 370/352 |
| 2003/0163738 A1 | * | 8/2003 | Couillard .................... 713/202 |

FOREIGN PATENT DOCUMENTS

JP 07-182064 2/1997

OTHER PUBLICATIONS

Christie Williams and Katherine Spanbaur, "Understanding password quality", Sep. 4, 2001, pp. 1-7, downloaded from http://www-128.ibm.com/developerworks/lotus/library/lS-password-quality/.*
"AppDetective TM for Lotus Domino Security Audit Categories", AppDetective, Application Security, Inc. 2001.
"Implementing, Monitoring, and Troubleshooting Security and User Accounts", Chapter 12, MCSE.
"Database Management with Oracle Enterprise Manager, An Oracle White Paper", An Oracle White Paper, Apr. 2001.

* cited by examiner

*Primary Examiner*—Taghi T. Arani
(74) *Attorney, Agent, or Firm*—Akerman Senterfitt

(57) ABSTRACT

A method of providing variably expiring passwords can include determining a complexity level for a password. Based upon the determined complexity level, an expiration duration can be calculated for the password. The password can be deactivated at a time determined by the expiration duration.

18 Claims, 2 Drawing Sheets

VARIABLE EXPIRATION OF PASSWORDS

BACKGROUND OF THE INVENTION

1. Technical Field

The present invention relates to the field of computer science and, more particularly, to compute security though password management.

2. Description of the Related Art

Passwords are an intrinsic part of functioning within a computerized society. Individuals can have many different passwords which are essential to daily activities. For example, a person can have one password to access an automatic teller machine (ATM) account, another password to access a work computer, another for an email account, yet another to access a second email account, and various other passwords to access Web sites, loyalty programs, and other restricted data areas. The person can have difficulty recalling necessary passwords, if each utilized password is significantly complex; as secure passwords should be to prevent unauthorized accesses.

To further complicate matters, computer system passwords often have an associated expiration duration. An expiration duration can be a period of viability for which a password can remain valid. Many systems with expiring passwords maintain a history log so that previously utilized passwords cannot be reused. When systems have a short expiration duration for passwords, systems users, not desiring to constantly perform the mental exercise of deriving memorable, complex passwords, typically utilize shortcuts, which can be exploited by unauthorized users.

System user shortcuts can include techniques such as choosing trivial or simplistic passwords, to commonly use the same password among different computerized systems, to write down current passwords, and/or to create passwords that the system user will forget and have to later reset. Simplistic passwords can be guessed after a relatively small number of access attempts or can be discovered using password generation programs. Using the same password for different computing systems or accounts can increase the opportunities for non-authorized intrusions into both systems. Commonly used passwords can be especially troublesome when used with two different computer systems, one significantly more secure than the other. For instance, "hackers" may gain access to a highly secure system by using a password acquired from a less secure system. The practice of writing down passwords is flawed as a written password is always subject to detection by observation. Worse, written passwords are often recorded in insecure locations, such as on the computer monitor or by a computer desk, and hence can be easily discovered.

Finally, forgetting passwords is so common that many systems provide a security question that allows users to automatically change their passwords. This practice prevents administrators from having to constantly respond to a multitude of user calls about forgotten passwords and manually resetting user accounts. Such security questions are generally simple and contain easily discoverable information like "what is your pet's name," or "your mother's maiden name." These security passwords provide an alternative means for circumventing a system's security features. For the aforementioned reasons among others, the password expiration feature within many computer systems, which is intended to increase system security, can actually reduce system security.

SUMMARY OF THE INVENTION

The invention disclosed herein provides a method and a system for providing passwords with variable expirations. In particular, a password can be assigned a complexity rating, which can determine an expiration duration for the password. For example, an extremely complex password can be assigned a two year expiration duration, while an extremely simple password can be assigned a 15 day expiration duration. In particular embodiments, sufficiently complex passwords may never expire. By rewarding complex passwords with longer expiration durations, users can be motivated to spend time determining complex passwords that are also capable of being recalled. Poorly chosen passwords, similarly, impose a disadvantage upon a user of having a shorter than average expiration duration.

One aspect of the present invention can include a method of providing variably expiring passwords. A complexity level can be determined for the password. Based upon the complexity level, an expiration duration can be calculated for the password. The higher the complexity level, the longer the resulting expiration duration. In one embodiment, the password can be compared to a list of words that appear within a dictionary. In another embodiment, the password can be compared against alphanumeric sequences, such as "ABCD" or "1234." In yet another embodiment, the password can be compared password against combinations of characters in close proximity to one another on a keyboard, such as "QWERTY" or "asdfg." Additionally, the password can be compared with personal information about a user associated with the password. In the above embodiments that make comparisons between a password and a string, a match can result in a decreased complexity level.

In one embodiment, a system access level can be associated with a user and a password. A higher system access level can result in a decreased complexity level. Additionally, password detection programs, often used by "hackers", can be executed in an attempt to determine the password. The complexity level of the password can be decreased if the time required for the password detection program to detect the password is less than a specified time. Passwords can be grouped into multiple categories based upon complexity level values. A password duration associated with a password within a category can be adjusted by adjusting a value associated with the category.

In one embodiment, a user can be prompted to change the password. The user can enter a new password different from the previous password. A new complexity level and expiration duration can be determined for the new password. The password can be deactivated at a time determined by the expiration duration.

Another aspect of the present invention can include a system for establishing password duration. The system can include a password complexity generation means for determining a complexity level associated with at least one password for the system. The system can also include a password expiration means for invaliding the password after a determined duration. The determined duration can be based at least in part upon the complexity level of the password. An administrative interface can be configured to allow an administrator of the system to adjust parameters controlling aspects of the system.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a system and a method for providing passwords with variable expirations. More particularly, a password can be assigned a complexity level that corresponds to a level of difficulty in determining an otherwise unknown password. The duration for which the password is valid can depend upon the associated complexity level for that password. Upon the expiration of the specified duration, the password can lapse and a user can be prompted to enter a new password.

Figure 1:
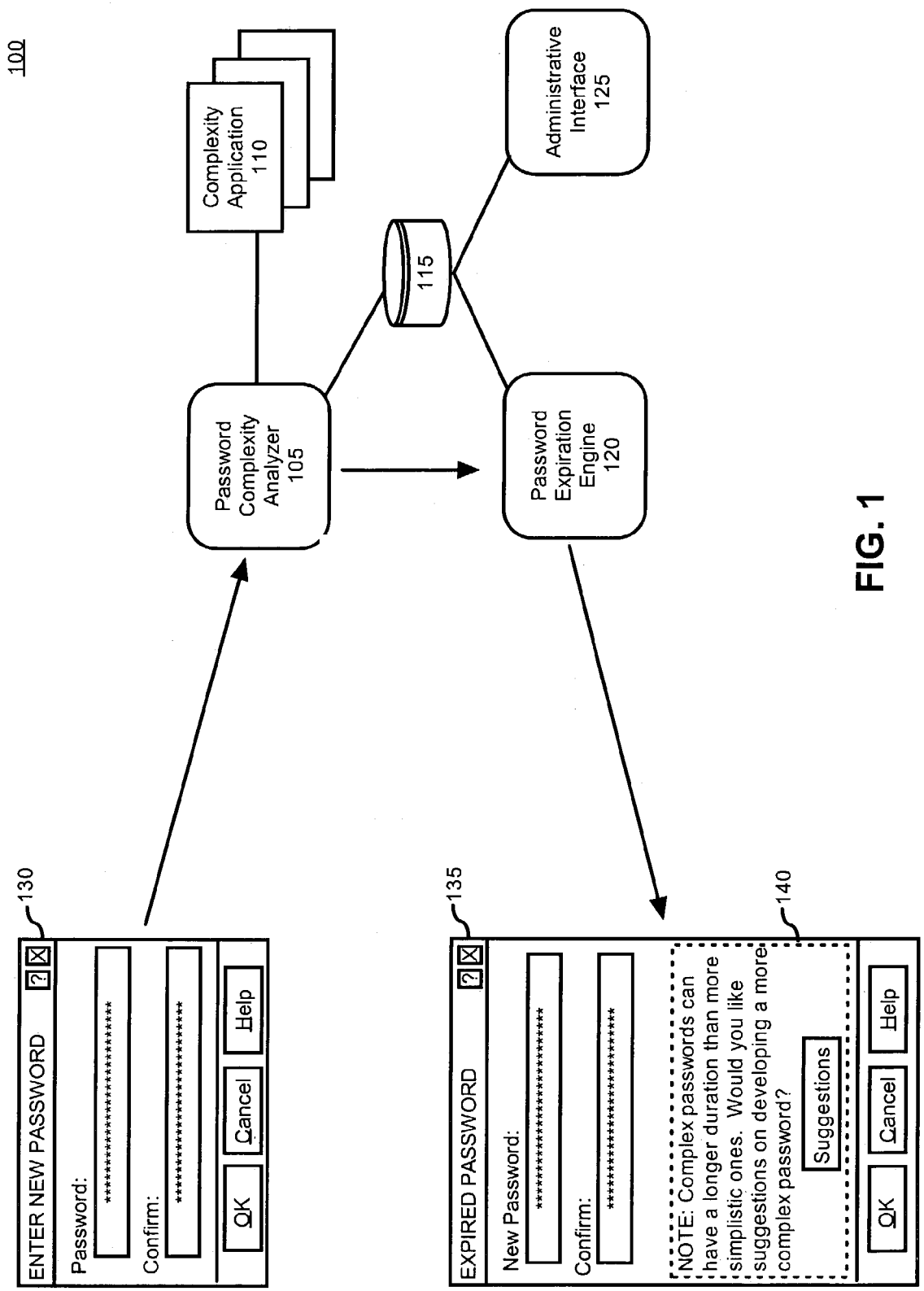
FIG. 1 is a schematic diagram illustrating a system that provides passwords with variable expirations in accordance with the inventive arrangements disclosed herein.

FIG. 1 is a schematic diagram illustrating a system 100 that provides passwords with variable expirations in accordance with the inventive arrangements disclosed herein. The system 100 can include a password complexity analyzer 105, a complexity application 110, a password data store 115, a password expiration engine 120, and an administrative interface 125. The password complexity analyzer 105 can examine a password and assign a complexity level to the password. An expiration duration for the password can directly relate to the value of the assigned complexity level.

For example, in one embodiment, the password complexity analyzer 105 can assign a real number value between 0 and 1 to a password, where 0 indicates a "perfect" or highly complex password and 1 indicates a simplistic password. In this example, a long password with random symbols, such as "L!L^n4lhyF", may be assigned a complexity level value that is approximately 0, such as a value of 0.04, and a simple password, such as "password," may be assigned a complexity level that is approximately 1, such as a value of 0.96. One advantage to using a scale, such as the exemplary one, can be the ease with which password duration can be determined from the complexity level. For instance, the password duration can be determined by dividing a time constant by the complexity level.

In one configuration, a password that is sufficiently complex, such as one having a value of 0.1 or less according to the scale of the previous example, can endure indefinitely. Similarly, a password that is sufficiently simplistic, such as one having a value greater than 0.95 on the previous scale, either can expire almost immediately or not be allowed at all. In another configuration, the password complexity analyzer 105 can have minimum age and a maximum age, representing durational ceilings and floors, for which a password can remain viable. In another configuration, the complexity level, instead of being a real number, can be a value on a scale of discrete values. In one embodiment, such a complexity level can be selected from discrete values including "excellent," "good," "fair," "poor," and "unacceptable."

There are many different approaches that the password complexity analyzer 105 can use to determine the complexity level of passwords, such as performing a list-lookup and pattern searches. For example, a list of known words, such as those found in a dictionary, can be used in determining the complexity level, wherein passwords matching words within the list have a less favorable complexity level than non-matched passwords. The matching list can include words from one or more dictionaries written for one or more languages, acronyms, names and proper nouns, administrator defined words, and any other definable string of characters. In one embodiment, the characters within a password can be reversed and this reversed word checked against a list of words. A reverse word may have a higher complexity rating than one written in normal order, yet a lower complexity rating than a word not locatable within a dictionary list. Similarly, common derivatives of list words can be searched, such as "password1" or "mypassword," with matches resulting in a lower complexity level. When a match between a password and a list item is found, but the password has additional embedded numbers or symbols imposed within it, the complexity level for the password can be greater than a complexity level associated with a different password that exactly matches the list item.

Common patterns that can be searched for include alphanumeric sequences and proximity patterns. For example, an alphanumeric sequence can include a combination, such as "ABCD", "1234", "ZYX", "2468", and "1235711 . . . " (prime numbers). Proximity patterns are character sequences in proximity to one another on a keyboard, such as "QWERTY", "jkl;", and "%$#@!". Patterns can be discovered through the use of mathematical pattern-matching algorithms. Passwords not containing discoverable patterns can have a higher complexity level than those with discoverable patterns. Various complexity levels can be assigned to passwords with discovered patterns; more complex patterns resulting in a higher complexity level than more simplistic ones.

In yet another example, the password complexity analyzer 105 can access personal information about the user associated with a password in determining a complexity level. For instance, the business computer can search a business owned employee database for items such as phone number, address, zip-code, and birth date and consider this personal information in determining the complexity level. Matches with personal information can result in lower complexity levels. Alternately, the password complexity analyzer 105 can compare a new password with historically used ones examining the degree of variation from previous passwords. For example, if a previous password was "dorunrun1" and a new password was "dorunrun2" the complexity level of the new password can be lowered. Any available analysis technique or combination of techniques can be used by the password complexity analyzer 105 to determine complexity level.

The complexity application 110 can contain algorithms and programs that can be used to determine or adjust the complexity level of a password. For example, the complexity application 110 can include a series of analysis routines that the password complexity analyzer 105 executes when determining a complexity level. In such an implementation, the complexity application 110 can function as an independent check to assure no unauthorized modification has occurred and that the password complexity analyzer 105 is executing properly. Alternately, the supplemental password application can include programs designed to modify pre-existing complexity levels.

There are many reasons why modification of existing complexity levels may be desirable. For example, changes in information, such as personal information, may cause an otherwise complex password to be easily determined. For example, if Mary Smith married Mr. Mocmood, the password "MaryMocmood," when used by the formerly named Mary Smith—now Mary Mocmood—can result in a low complexity level. Additionally, some detection applications can require considerable processing power and/or time to discern a password. For example, some brute force password detection programs can take hours or days to operate. Since unauthorized personnel commonly use such detection programs, passwords that are easily "cracked" through such password detection programs can result in lower complexity levels. For instance, passwords detected within a specified time, such as three hours or less, using a password detection program can result in the lowering of a complexity rating by ten percent.

The password data store 115 can store active passwords, complexity levels, password history, and other password related information. The password data store 115 can use any storage and retrieval mechanism, including database systems and file based systems. In one embodiment, the password data store 115 can utilize a temporary storage location, such as random access memory (RAM). In another embodiment, the password data store 115 can utilize a more permanent storage location, such as a local or networked magnetic or optical media.

The password expiration engine 120 can manage options and features relating to the actual expiration of passwords. For example, the password expiration engine 120 can prompt a user that a password has or is about to expire and facilitate the entry of a replacement password. The password expiration engine 120 can also implement a grace period for password expiration. For example, once an expiration duration has run on a system, the password expiration engine 120 can allow the user to access a system three more times without changing to a new password before access is refused. Once a grace period, if any, has expired, the password expiration engine 120 can deactivate an expired password.

The administrative interface 125 can allow an authorized administrator to monitor activities and modify behavior within a system 100. For example, the administrative interface 125 can monitor the number of times users change passwords within a specified duration as well as identify the computing devices from which the password changes were made. In one embodiment, the administrative interface 125 can manually re-active expired passwords and alter password durational characteristics. In another embodiment, the administrative interface 125 can change environmental parameters, such as the maximum age of a password, criteria used for computing complexity levels, and the manner in which calculations for expiration duration are based. Any administrative features relating to the system 100 can be performed within the administrative interface 125.

In operation, a graphical user interface 130 (GUI) can prompt a user to enter an initial password. An input mask can be applied to the GUI 130, as well as some entry checking features that can require a password to be a certain number of characters and/or contain alphanumeric entries. Additionally, a confirmation block can be included within the GUI 130 to minimize typing errors during password entry. Once a password is entered, the password complexity analyzer 105 can determine a complexity level for the password. An expiration duration can be assigned based upon the complexity level. When determining the complexity level of a password, the password complexity analyzer 105 can access a complexity application 110. Password data can be stored within the password data store 115. Thereafter, a complexity application 110 can monitor the computed complexity level and expiration duration information and make adjustments to this information based upon predetermined criteria.

Once the expiration duration has passed, the password expiration engine 120 can prompt a user to create a replacement password with a GUI 135. If no password is created after a designated grace period, the password expiration engine 120 can terminate the password. It should be noted that some systems can have no grace period and can immediately deny system access to passwords that have lapsed. GUI 135 can include an explanatory section 140 that informs a user that an expiration duration can be longer for more complex passwords. Additionally, the section 140 can provide suggestions on ways to construct passwords with favorable complexity level values.

It should be noted that the duration assigned to a password need not be fixed within a system for all account types. For example, in one embodiment, the privileges associated with a computer account can alter the password expiration duration. Computer accounts with system administrator privileges can have different complexity level standards and/or expiration duration factors. For instance, an identical password can have a more favorable complexity level value if the associated account was a guest account with limited privileges than if the associated account was a system administrator account with expansive privileges. In a different example, two accounts, a system administrator account and a guest account, can have the same complexity level, yet the system administrator account can have an expiration duration less than the expiration duration of the guest account. Such an example indicates a different formula or association of complexity values to duration which varies according to user class can exist.

Figure 2:
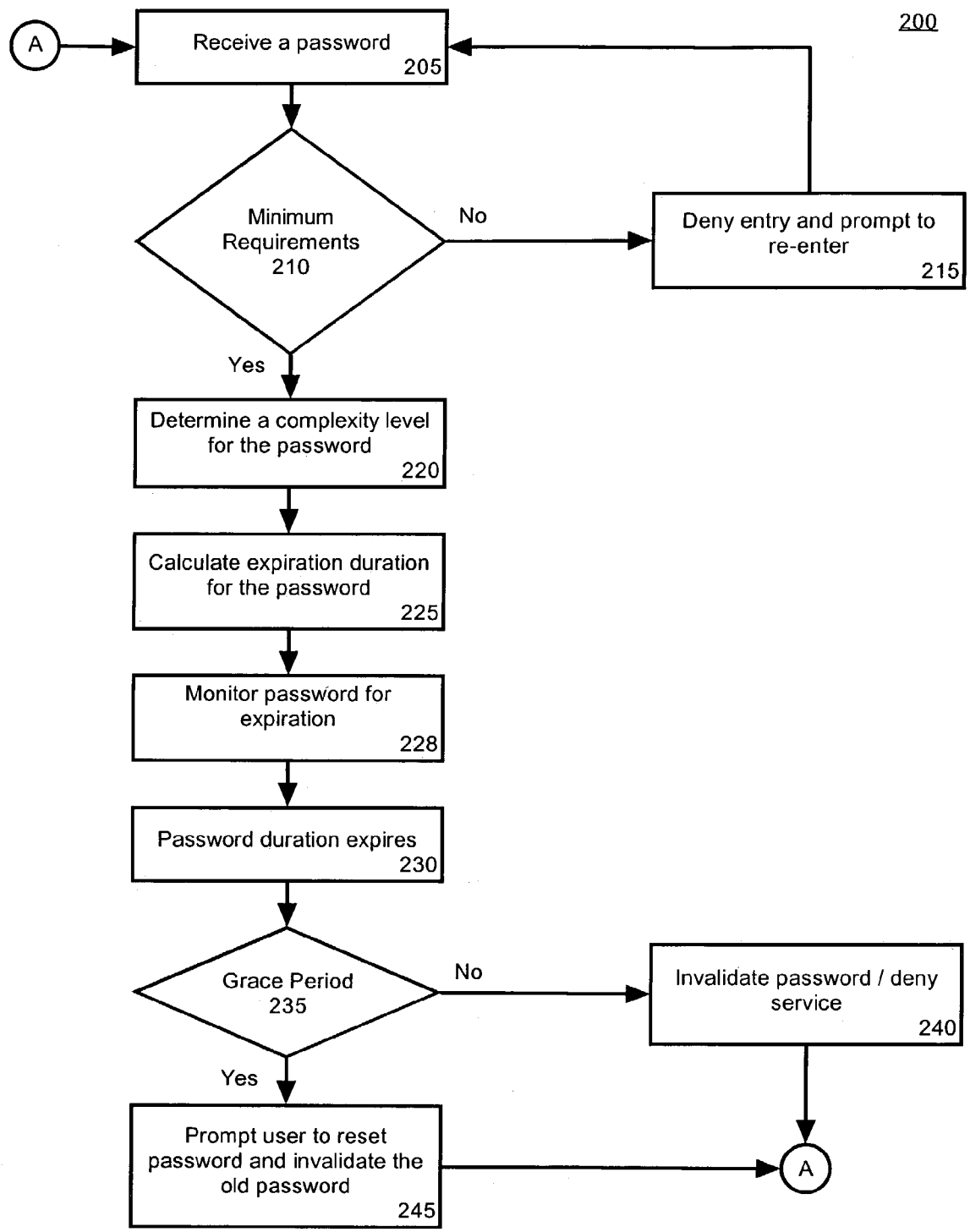
FIG. 2 is a flow chart illustrating a method for implementing passwords with variable expiration durations using the system of FIG. 1.

FIG. 2 is a flow chart illustrating a method 200 for implementing passwords with variable expiration durations using the system of FIG. 1. The method 200 can be performed within any computing environment that utilizes passwords. While method 200, as presented, represents a process established for a single user, it can be applied for multiple uses as well. For instance, the method 200 can be implemented in parallel, each parallel process directed towards a different user. The method 200 can begin in step 205, where a password is received. The password can be received based on user input, can be assigned by a supervisor or group leader, can be assigned by a system administrator, and/or can be gathered from a storage location. Gathering passwords from a storage location can be useful when initially installing and implementing the method within existing security systems.

In step 210, the received password can be optionally checked to determine if minimum requirements are satisfied. Minimum requirements can vary from system to system. One example of a typical requirement can include a minimum character length, such as six characters, for the password. Another minimum requirement can assure that any confirmation password is equivalent to the entered password. Yet another requirement can compare the entered password against a limited set of words, such as profanities, and disallow the password if a match is achieved with a word within the limited set. If a particular implementation chooses not to include step 210, the method can proceed directly to step 220.

If minimum requirements are not met, the method can proceed to step 215 where the password attempt or entry is denied. A user can then be prompted to re-enter a password. Thereafter, the method can proceed to step 205. If the minimum requirements of step 210 are satisfied, the method can proceed to step 220, where a complexity level for the entered password can be determined. The complexity level can represent the level of difficulty that an unauthorized user would have when attempting to divine the password. This complexity level can be determined by any of the previously mentioned mechanisms or any other suitable mechanism.

In step 225, an expiration duration can be calculated for the password based, at least in part, upon the complexity value. For example, if complexity levels are real numbers between 0 and 1, with 0 being a favorable value, then the password duration can be a factor divided by the complexity level. Assuming a factor of 15 days and a complexity value of 0.1, then the password duration can be 150 days. In an alternative example, a look-up table containing expiration durations corresponding to discrete complexity level values can be used during this calculation. In such an example, a complexity level of a simplistic password can have a corresponding expiration duration of 20 days, while a complexity level of a complex password can have a corresponding expiration duration of 200 days. In step 228, the expiration duration for a password can be monitored and associated system variables for tracking expiration duration updated. Notably, the expiration duration can be time dependant, expiring upon a certain date according to a system clock, and/or can be linked to predetermined number of accesses, such as one hundred system uses.

In step 230, the established password duration can expire. In step 235, the method can look for an applicable grace period. If the method fails to include a grace period or if the method includes a grace period that has expired, the method can proceed to step 240. In step 240, the password can be invalidated and service denied to a user associated with that password until a new, valid password is received. Accordingly, the user of an expired password may need to call a system administrator before access can be re-established. The system administrator can reset a user's password, causing the method to proceed to step 205. If an applicable grace period exists for step 235, the method can proceed to step 245. In step 245, a user of the password can be prompted to enter a new password and the old password can be invalidated. The system can then automatically proceed to step 205.

The various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing variably expiring passwords comprising the steps of:
    determining a complexity level for a password by comparing said password against a list of words, wherein each of said words appear within a dictionary, wherein a match results in a decreased complexity level, wherein said complexity level comprises a rating of complexity of contents of said password;
    based upon said complexity level, calculating an expiration duration for said password, wherein a higher complexity level results in a longer expiration duration relative to an expiration duration associated with a lower complexity level; and
    deactivating said password at a time determined by said expiration duration.

2. The method of claim 1, further comprising the steps of:
    prompting a user associated with said password to change said password;
    responsively receiving a new password different from said password; and
    determining a new complexity level and a new expiration duration for said new password.

3. The method of claim 2, said prompting step further comprising the steps of:
    informing said user that said expiration duration relates to said complexity level; and
    presenting said user with guidelines to construct a complex password.

4. The method of claim 1, said determining step further comprising the step of:
    comparing said password with personal information about a user associated with said password, wherein a match results in a decreased complexity level.

5. The method of claim 1, further comprising the steps of:
    executing a password detection program to determine said password; and
    decreasing said complexity level if a time required for said password detection program to detect said password is less than a specified time.

6. The method of claim 1, further comprising the steps of:
    grouping a plurality of said passwords into a category based upon complexity level values; and
    adjusting said password duration for said passwords within said category by adjusting a value associated with said category.

7. The method of claim 1, said determining step further comprising the steps of:
    identifying a system access level associated with a user, wherein said password is associated with said user; and
    basing, at least in part, said complexity level upon said system access level, wherein a higher system access level results in a decreased complexity level.

8. A method of providing variably expiring passwords comprising the steps of:
    determining a complexity level for a password by comparing said password against alphanumeric sequences, wherein a match results in a decreased complexity level, wherein said complexity level comprises a rating of complexity of contents of said password:

based upon said complexity level, calculating an expiration duration for said password, wherein a higher complexity level results in a longer expiration duration relative to an expiration duration associated with a lower complexity level; and deactivating said password at a time determined by said expiration duration.

9. A method of providing variably expiring passwords comprising the steps of:

determining a complexity level for a password by comparing said password against combinations of characters in close proximity to one another on a keyboard, wherein a match results in a decreased complexity level, wherein said complexity level comprises a rating of complexity of contents of said password;

based upon said complexity level, calculating an expiration duration for said password, wherein a higher complexity level results in a longer expiration duration relative to an expiration duration associated with a lower complexity level; and deactivating said password at a time determined by said expiration duration.

10. A machine-readable storage having stored thereon, a computer program having a plurality of code sections, said code sections executable by a machine for causing the machine to perform the steps of:

determining a complexity level for a password by comparing said password against a list of words, wherein each of said words appear within a dictionary, wherein a match results in a decreased complexity level, wherein said complexity level comprises a rating of complexity of contents of said password;

based upon said complexity level, calculating an expiration duration for said password, wherein a higher complexity level results in a longer expiration duration relative to an expiration duration associated with a lower complexity level; and deactivating said password at a time determined by said expiration duration.

11. The machine-readable storage of claim 10, further comprising the steps of:

prompting a user associated with said password to change said password;

responsively receiving a new password different from said password; and determining a new complexity level and a new expiration duration for said new password.

12. The machine-readable storage of claim 11, said prompting step further comprising the steps of:

informing said user that said expiration duration relates to said complexity level; and presenting said user with guidelines to construct a complex password.

13. The machine-readable storage of claim 10, said determining step further comprising the step of:

comparing said password with personal information about a user associated with said password, wherein a match results in a decreased complexity level.

14. The machine-readable storage of claim 10, further comprising the steps of:

executing a password detection program to determine said password; and decreasing said complexity level if a time required for said password detection program to detect said password is less than a specified time.

15. The machine-readable storage of claim 10, further comprising the steps of:

grouping a plurality of said passwords into a category based upon complexity level values; and adjusting said password duration for said passwords within said category by adjusting a value associated with said category.

16. The machine-readable storage of claim 10, said determining step further comprising the steps of:

identifying a system access level associated with a user, wherein said password is associated with said user; and basing at least in part said complexity level upon said system access level, wherein a higher system access level results in a decreased complexity level.

17. A method of providing variably expiring passwords comprising the steps of:

determining a complexity level for a password comparing said password against a list of words, wherein each of said words appear within a dictionary, wherein a match results in a decreased complexity level, wherein said complexity level comprises a rating of complexity of contents of said password;

based upon said complexity level, calculating an expiration duration for said password, wherein a higher complexity level results in a longer expiration duration relative to an expiration duration associated with a lower complexity level; and deactivating said password at a time determined by said expiration duration.

18. A method of providing variably expiring passwords comprising the steps of:

determining a complexity level for a password comparing said password against combinations of characters in close proximity to one another on a keyboard, wherein a match results in a decreased complexity level, wherein said complexity level comprises a rating of complexity of contents of said password;

based upon said complexity level, calculating an expiration duration for said password, wherein a higher complexity level results in a longer expiration duration relative to an expiration duration associated with a lower complexity level; and deactivating said password at a time determined by said expiration duration.

* * * * *